US010934494B2

(12) United States Patent
Prasad et al.

(10) Patent No.: US 10,934,494 B2
(45) Date of Patent: Mar. 2, 2021

(54) PROCESS FOR PRODUCTION OF ANISOTROPIC COKE (71) Applicant: Indian Oil Corporation Limited, Mumbai (IN)

(72) Inventors: Terapalli Hari Venkata Devi Prasad, Faridabad (IN); Ponoly Ramachandran Pradeep, Faridabad (IN); Satyen Kumar Das, Faridabad (IN); Kamal Kumar, Faridabad (IN); Ramesh Karumanchi, Faridabad (IN); Madhusudan Sau, Faridabad (IN); Debasis Bhattacharyya, Faridabad (IN); Sanjiv Kumar Mazumdar, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 16/777,031

(22) Filed: Jan. 30, 2020

(65) Prior Publication Data
US 2020/0325407 A1 Oct. 15, 2020

(30) Foreign Application Priority Data

Apr. 9, 2019 (IN) .............................. 201921014283

(51) Int. Cl.
*C10G 69/06* (2006.01)
*B01D 3/14* (2006.01)
(Continued)

(52) U.S. Cl.
CPC .............. *C10G 69/06* (2013.01); *B01D 3/143* (2013.01); *B01D 11/0488* (2013.01);
(Continued)

(58) Field of Classification Search
CPC ...... C10G 55/00; C10G 55/04; C10G 57/045; C10G 67/16; C10G 69/06;
(Continued)

(56) References Cited

U.S. PATENT DOCUMENTS 2,775,549 A   12/1956  Shea, Jr.
2,922,755 A    1/1960  Hackley, Jr.
(Continued)

FOREIGN PATENT DOCUMENTS

CN      103497779 A     1/2014
WO      2007050350 A1   5/2007

OTHER PUBLICATIONS

Guo, Boyun Ghalambor, Ali. (2012). Natural Gas Engineering Handbook (2nd Edition)—7.2 Separation of Gas and Liquids. Gulf Publishing Company.*

*Primary Examiner* — Brian A McCaig
(74) *Attorney, Agent, or Firm* — Melissa M. Hayworth; E. Joseph Gess (57) ABSTRACT The present invention relates to a process for production of anisotropic coke from a hydrocarbon feedstock and a system for producing the same. More particularly, the present invention relates to a thermal cracking of heavy petroleum residue producing petroleum coke and lighter hydrocarbon products. The invented process utilizes a novel scheme for production of a premium quality coke from primarily, a clarified oil feedstock. Clarified oil from fluid catalytic cracking unit is routed through a process scheme comprising a separator column, hydrotreatment section and an aromatic extraction section to create an ad-mix of effluents which form the feedstock to a thermal cracking unit. Premium quality anisotropic coke is produced in the thermal cracker reactor drums under tailor made process conditions employing the said feedstock.

15 Claims, 1 Drawing Sheet (51) Int. Cl.
  *B01D 11/04* (2006.01)
  *B01J 19/00* (2006.01)
  *B01J 19/24* (2006.01)

(52) U.S. Cl.
  CPC ......... *B01J 19/0013* (2013.01); *B01J 19/245* (2013.01); *B01J 2219/0004* (2013.01); *B01J 2219/00157* (2013.01); *C10G 2300/202* (2013.01)

(58) Field of Classification Search
  CPC .............. C10G 2300/202; B01D 3/143; B01D 11/0488; B01J 19/0013; B01J 19/243; B01J 2219/0004; B01J 2219/00157
  See application file for complete search history.

(56) References Cited

U.S. PATENT DOCUMENTS

| | | |
|---|---|---|
| 3,759,822 A | 9/1973 | Folkins |
| 4,130,475 A | 12/1978 | Cameron et al. |
| 5,611,912 A * | 3/1997 | Han ................. C10G 65/12 208/58 |
| 2002/0179493 A1 | 12/2002 | Etter |
| 2003/0102250 A1 | 6/2003 | Siskin et al. |
| 2004/0182750 A1 * | 9/2004 | Khanna ................. C10G 53/04 208/326 |
| 2012/0097580 A1 | 4/2012 | Stiller |

* cited by examiner

PROCESS FOR PRODUCTION OF ANISOTROPIC COKE

FIELD OF THE INVENTION

The present invention relates to a process for production of anisotropic coke from a hydrocarbon feedstock and system for producing the same. More particularly, the present invention covers a thermal cracking process, used to crack heavy hydrocarbon molecules, thus converting it into gaseous and liquid product streams and leaving behind solid, carbonaceous petroleum coke. The invention in particular relates to a process for production of anisotropic coke suitable for manufacturing graphite electrodes, which can be used in electric arc furnace for production of steel and in batteries for electric vehicles.

BACKGROUND OF THE INVENTION

Delayed Coking process is a severe thermal cracking process for converting low value heavy residual hydrocarbon feedstock into lighter hydrocarbon products and solid coke. Based on the characteristics of the feedstock and operating conditions, different qualities of coke namely, Fuel grade, Anode grade and Needle grade/Anisotropic cokes can be produced employing Delayed Coking. Anisotropic coke is suitable for manufacturing graphite electrodes used in electric arc furnace for production of steel and in batteries for electric vehicles. Lower weight percent of sulfur (0.5 wt %) is preferred in anisotropic coke used for electrode manufacturing to avoid puffing or breakage problems of the electrode. The production and supply of anisotropic coke has been limited by availability of potential hydrocarbon feedstock, which is desired to have high aromatic content and low sulfur content.

U.S. Pat. No. 2,922,755 covers the process wherein reduced crude can be mixed with thermal tar to produce a mixture which results in a premium grade coke upon carrying out the delayed coking process provided that this reduced crude is present in the weight percent range of about 10 to about 30. More particularly, it describes a process wherein the feed is prepared by blending component A comprising of ~70-90% of highly aromatic thermal tar derived from thermal cracking of 100% catalytic or thermal cracker cycle oils or bottoms, a mixture of catalytic or thermal cracker cycle oils or bottoms and conventional coker gas oil and from about 10% to about 30% of Component B, which may be made up of one or more refinery residues such as (1) Virgin reduced crude (2) Duo-Sol extracts (3) Furfural extracts (4) Hydroformer bottoms.

U.S. Pat. No. 3,759,822 describes a method for producing premium coke comprising coking of a blend of a thermally or catalytically cracked heavy oil having a high aromatic content as a result of the thermal or catalytic cracking with a quantity of a pyrolysis tar which is obtained as a byproduct from the high temperature, diluent cracking of petroleum distillates to produce olefins U.S. Pat. No. 4,130,475 describes a process for producing needle coke from a fresh feedstock having a specified gravity, carbon residue and boiling distribution and incorporating thermal tar, internally produced through thermal cracking of gas oil obtained from delayed coking as a supplement to the fresh feed.

Chinese Pat. No. CN103497779A describes a process wherein CLO is subjected to solvent extraction process to enrich aromatic content is described.

As per the processes discussed in the cited prior arts above, it can be observed that conventional feed stocks for anisotropic coke include thermal tars, combination of thermal tars & reduced crude, thermally or catalytically cracked oils etc. U.S. Pat. No. 2,775,549 discloses an early process for making premium coke from certain petroleum residues, sulfur content of the feed blend is ~1.1% while in U.S. Pat. No. 3,759,822, the sulfur content of pyrolysis tar is ~0.3-0.8%.

This invention aims to produce premium quality anisotropic coke from clarified oil based feedstock including those having low aromatic content and high sulphur content, by subjecting it to a myriad of interrelated processing steps including distillation, hydrogenation, aromatic extraction and coking.

Objectives of the Invention

It is the primary objective of the present invention is to provide a process for producing anisotropic petroleum coke and lighter hydrocarbon products.

It is the further objective of the present invention to provide a process for production of premium quality anisotropic coke, the process utilizes a novel scheme for employing Clarified Oil feedstocks having low aromatic content and high sulphur content obtained from catalytic cracking units which are not suitable for Anisotropic coke production.

It is the further objective of the present invention is to provide a process to produce premium quality coke under tailor made process conditions employing the said feedstock.

SUMMARY OF THE INVENTION

Accordingly, present invention provides a process for production of anisotropic coke from a hydrocarbon feedstock comprising:

(i) routing a first fraction of the hydrocarbon feedstock to a separator column and a second fraction of the hydrocarbon feedstock to an aromatic extractor unit;

(ii) separating the first fraction of the hydrocarbon feedstock in the separator column, in to a lighter material and a first heavy material;

(iii) desulfurizing the first heavy material in a hydrotreater reactor to obtain a second heavy material;

(iv) aromatic extracting the second fraction of the hydrocarbon feedstock in the aromatic extractor unit parallel to the separator column with a solvent to obtain an aromatic extract stream and a paraffinic raffinate stream;

(v) sending a combined feedstock comprising the lighter material, the second heavy material and the aromatic extract stream to a main fractionator column of a thermal cracker unit to obtain a secondary feedstock; and (vi) heating the secondary feedstock in a furnace to obtain a hot secondary feedstock and thermally cracking the hot secondary feedstock in coke drums for producing the anisotropic coke and lighter hydrocarbon product.

In one of the feature of the present invention, the desulfurization comprises:

(a) heating the first heavy material in a furnace section along with a recycle hydrogen stream from a compressor to obtain a hot feed stream;

(b) desulfurizing the hot feed stream in the hydrotreater reactor for generating a desulfurized fraction; and (c) routing the desulfurized fraction to a high pressure separator to separate a hydrogen gas from the desulfurized fraction and then to a low pressure separator to separate other gaseous product and the second heavy material.

In another feature of the present invention, the step (a) of desulfurization process optionally adding make up hydrogen gas stream as per requirement. In one feature of the present invention, in the step (b), mild desulfurization condition is used for desulfurizing the hot feed stream in a hydrotreater reactor for generating a desulfurized fraction.

In one feature of the present invention, the aromatic extraction comprises:

a. extracting the second part of the feedstock in the aromatic extractor unit with the solvent streams coming from solvent recovery sections to obtain the paraffinic raffinate stream and an initial aromatic extract stream;

b. sending the paraffinic raffinate stream to a first solvent recovery section to separate the solvent and to obtain a paraffinic raffinate and routing the paraffinic raffinate to other secondary processing units for further conversion; and c. sending the initial aromatic extract stream to a second solvent recovery section to separate the solvent and to obtain the aromatic extract stream.

In one of the feature of the present invention, the thermal cracking comprises:

(a) heating the secondary feedstock in a heat furnace to obtain a hot secondary feedstock;

(b) thermal cracking the hot secondary feedstock in one of coking drums, which is in feed processing mode by providing an extended residence time to allow completion of coking reactions to obtain a product vapor and anisotropic coke;

(c) routing the product vapor to the main fractionator column to obtain gaseous products, naphtha, kerosene, light gas oil, heavy gas oil and fuel oil component; and (d) removing the anisotropic coke by a decoking operation.

In another feature of the present invention, in the above thermal cracking, the gaseous products along with naphtha are sent to a gas concentration section for further separation. In yet another feature of the present invention, in step (a) of the above thermal cracking, the secondary feedstock is mixed with an internal recycle fraction/stream in a bottom section of the main fractionator column.

In one of the feature of the present invention, the weight ratio of the hydrocarbon feedstock split into two fractions or streams routed to the separator column and the aromatic extractor unit is in the range of 0.1 to 10.

In another feature of the present invention, the hydrocarbon feedstock is selected from the group consisting of clarified oil or slurry oil from fluid catalytic cracking unit, reduced fuel oil (RFO) from the bottom of delayed coker quench column, coker fuel oil, reduced crude oil, vacuum residue, vacuum gasoil, aromatic extracts, thermal tar, ethylene tar, unconverted oil from hydrocracker unit and a blend thereof. The Conradson carbon residue content of the feedstock can be 0.1 wt %-18 wt % and preferably above 0.2 wt % and density can be minimum of 0.87 g/cc.

In one of the preferred feature, the hydrocarbon feedstock is clarified oil feedstock having Sulfur in the range of 1-5 wt %, Aromatics in the range of 40-90 wt %, Saturates in the range of 5-30 wt %, $H_2$ in the range of 5-15 wt %, and Aromaticity in the range of 10-80 wt %.

In yet another feature of the present invention, the separator is selected from a flasher-separator column or a distillation column, where the material boiling below a certain temperature, in the range of 350 to 370° C. is separated from that boiling above said temperature.

In one feature of the present invention, the separator column operates at a pressure of 0.1 to 3 $Kg/cm^2$(g) with a bottom temperature in the range of 350 to 380° C.

In another feature of the present invention, the hydrotreater reactor operates at a temperature ranging from 330 to 380° C. and pressure ranging from 40 to 50 Bar.

In another feature of the present invention, the aromatic extractor unit is operated at a temperature ranging from 30 to 150° C. with the solvent/hydrocarbon feedstock weight ratio ranging from 1:1 to 3:1 (wt/wt).

In yet another feature of the present invention, the solvent is selected from the group consisting of N-methyl pyrrolidone (NMP), diethylene glycol, sulpholane, dimethyl sulfoxide, monomethyl formamide, tetraethylene glycol and furfural.

In yet another feature of the present invention, the thermal cracker unit producing the anisotropic coke is operated at a temperature ranging from 470 to 510° C. and a pressure ranging from 0.5 to 15 $Kg/cm^2$ (g). Preferably the thermal cracker unit is operated at a temperature ranging from 480° C. to 500° C., and pressure ranging from 1 to 6 $Kg/cm^2$ (g). The residence time provided in coke drums is in the range of 10-30 hours.

Accordingly, the present invention also provides a system for production of anisotropic coke from a hydrocarbon feedstock comprising:

a separator column to receive a first fraction of the hydrocarbon feedstock and separating it in to a lighter material and first heavy material;

(ii) an aromatic extractor unit parallel to the separator column for extracting a second fraction of the hydrocarbon feedstock with a solvent to obtain an aromatic extract stream;

(iii) a hydrotreater reactor in connection with the separator column for desulfurizing the first heavy material to obtain a second heavy material; and (iv) a thermal cracker unit having a main fractionator column, furnace and coke drums for thermally cracking a combined feedstock consisting of the lighter material, aromatic extract stream and second heavy material for producing the anisotropic coke and lighter hydrocarbon product.

In one of the feature of the present invention, the system comprises:

(a) a furnace section in connection and prior to the hydrotreater reactor for heating the first heavy material along with a recycle hydrogen stream to obtain a hot feed stream;

(b) a compressor in connection with the furnace section for providing the recycle hydrogen stream;

(c) the hydrotreater reactor for desulfurizing the hot feed stream for generating a desulfurized fraction; and (d) a high pressure separator for separating the desulfurized fraction in to a hydrogen gas and a low pressure separator to separate other gaseous product and second heavy material.

In another feature of the present invention, the system comprises:

a. the aromatic extractor unit parallel to the separator column for extracting the second part of the feedstock with the solvent streams to obtain a paraffinic raffinate stream and an initial aromatic extract stream;

b. a first solvent recovery section to receive the paraffinic raffinate stream and to separate the solvent to obtain a paraffinic raffinate and recovered solvent; and c. a second solvent recovery section to receive the initial aromatic extract stream and to separate the solvent and to obtain the aromatic extract stream.

In yet another feature of the present invention, the system comprises:

a. the main fractionator column which receives a combined feed stream from separator column, aromatic extraction section and hydrotreatment section to prepare a secondary feedstock and also for fractionating the product vapor from coke drums to obtain a gaseous product, kerosene, light gas oil, heavy gas oil and fuel oil component;

b. a furnace for heating the secondary feedstock from the main fractionator column and to obtain a hot secondary feedstock; and c. coking drums for coking through thermal cracking of the hot secondary feedstock in feed processing mode by providing an extended residence time to allow completion of coking reactions to obtain a product vapor and the anisotropic coke.

In one of the preferred feature the anisotropic coke obtained from the process or system of the present invention is premium quality anisotropic coke.

BRIEF DESCRIPTION OF THE DRAWINGS

The FIGURE illustrates a schematic diagram of a process scheme of the Present Invention.

DETAILED DESCRIPTION OF THE INVENTION

Figure 1:
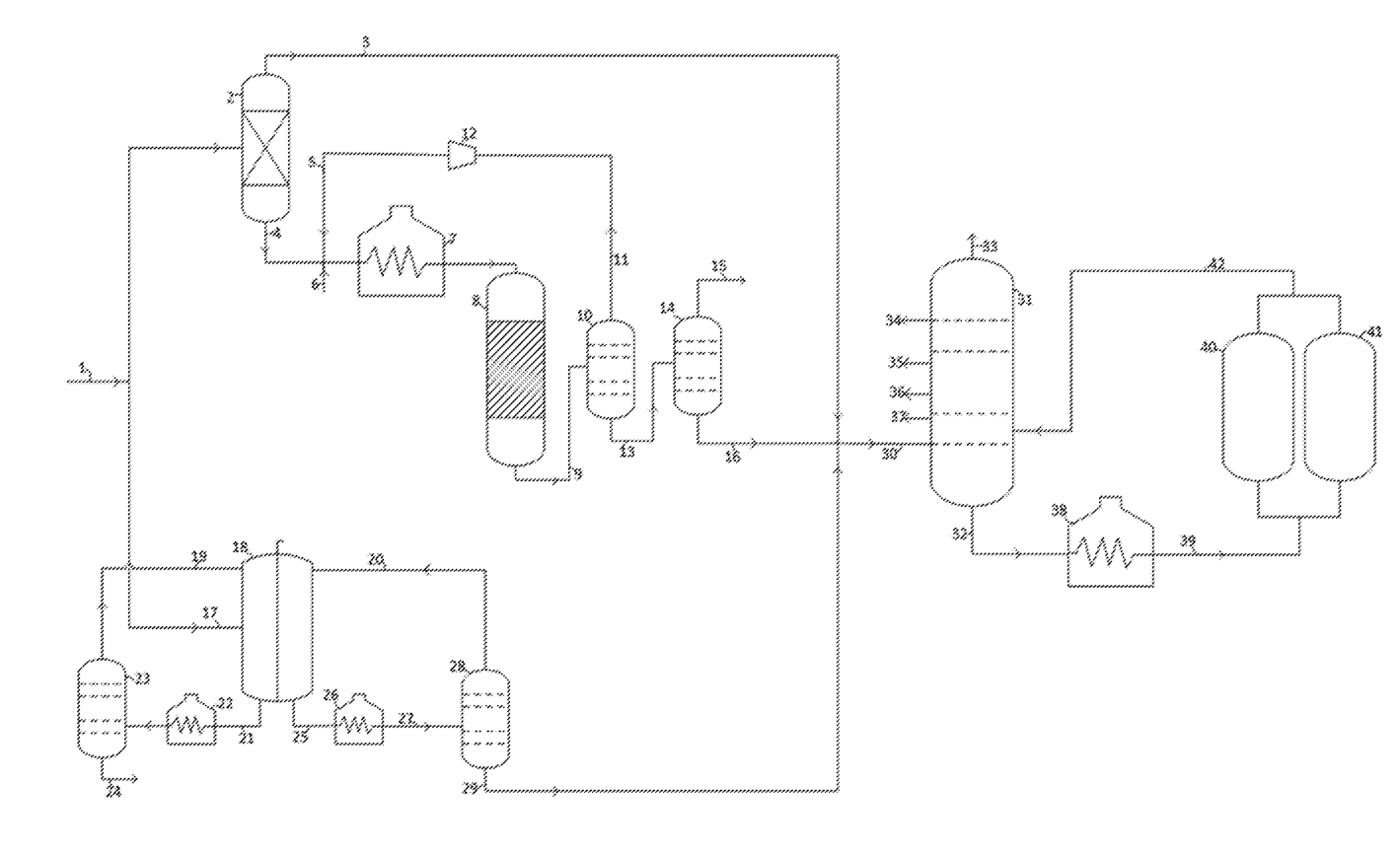

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Feedstock

Conventional feed stocks for producing high quality anisotropic coke contain low sulfur content and higher aromatic contents. In the present invention, the anisotropic coke can be prepared from a high sulfur and low aromatic feedstock.

The liquid hydrocarbon feedstock to be used in the process is primarily selected from hydrocarbon feed streams like clarified oil or slurry oil from fluid catalytic cracking unit, but other streams namely 'reduced fuel oil' (RFO) from the bottom of delayed coker quench column, coker fuel oil, reduced crude oil, mixture of vacuum residue and vacuum gasoil, aromatic extracts, thermal tar, ethylene tar, unconverted oil from hydrocracker unit etc. can also be used as a part of the feedstock entering this process. The Conradson carbon residue content of the feedstock can be 0.1 wt % to 18 wt % and preferably above 0.2 wt % and density can be minimum of 0.87 g/cc.

The above feed stock is subjected to a pre-treatment comprising of:

(a) One part of a high sulfur feed stock is subjected to Hydrotreatment for reduction of sulfur without compromising on aromaticity.

(b) Another part of the high sulfur feed is subjected to aromatic extraction for enhancing the aromaticity of the feed blend.

Process Conditions:

The ratio (weight/weight) in which the hydrocarbon feedstock is split into two fractions routed to boiling point based separator and the aromatic extraction unit is in the range of 0.1 to 10, depending upon the desired feed quality of the feedstock going to the thermal cracking section to produce anisotropic coke.

The separator shall be a flasher-separator column or a distillation column, where the material boiling below a certain temperature, in the range of 350 to 370° C. is separated from that boiling above said temperature. The separator shall operate at a pressure of 0.1 to 3 $Kg/cm^2(g)$ with a bottom temperature in the range of 350 to 380° C. The process conditions will be selected from within these ranges of values, taking into account the sulfur compound distribution in the feedstock, so as to concentrate the maximum sulfur containing compounds in the heavy material separated at the bottom of the separator. Preferably, the hydrocarbon feedstock is clarified oil feedstock.

The hydrotreater unit operates at a reactor temperature ranging from 330 to 380° C. and pressure ranging from 40 to 50 Bar.

The aromatic extraction unit is operated with N-methyl pyrrolidone (NMP) or furfural solvent to extract the aromatic rich molecules from the clarified oil feedstock. This unit is operated at a temperature ranging from 30 to 150° C. with a Solvent/Oil ratio ranging from 1:1 to 3:1 (wt/wt). The aromatic extraction process enhances the average number of aromatic rings per molecule of the aromatic extract compared to the input clarified oil feedstock. Preferably, the aromatic extraction process enhances the average number of benzene rings per molecule of the aromatic extract compared to the input clarified oil feedstock.

The thermal cracker unit producing the premium quality coke may be operated at desired operating temperature ranging from 470 to 510° C., preferably between 480° C. to 500° C. and desired operating pressure ranging from 0.5 to 15 $Kg/cm^2$ (g) preferably between 1 to 6 $Kg/cm^2$ (g). The residence time provided in coke drums is in the range of 10 to 30 hours.

Process Description:

The process of the present invention is exemplified by, but not limited to the FIGURE.

A schematic process flow diagram of the invented process is provided in the FIGURE. Feedstock (1) is partly routed to a separator column (2) and an aromatic extractor unit (18). From the separator column (2), the lighter materials (3) were separated from heavy material (4). Heavy material (4) is then heated in a furnace section (7) along with the recycle hydrogen stream from the compressor (12). Make up hydrogen gas stream is also added as per requirement. The hot feed stream is then routed to a hydrotreater reactor (8) where mild desulfurization reactions take place and the desulfurized material (9) is generated. The desulfurized fraction is then routed to high pressure separator (10) to separate the hydrogen gas (11) and a low pressure separator (14) to separate other gaseous products (15).

A part of the feedstock (1) routed to the extractor unit (18) to aromatic extraction by contacting with the solvent streams (19, 20) coming from the solvent recovery columns of extract and raffinate. The paraffinic raffinate stream (21) from the extractor unit is heated in a heater (22) and then sent to a solvent recovery column (23). The paraffinic raffinate (24) may be routed to other secondary processing units for further conversion. The aromatic extract stream (25) is heated in a heater (26) and then the hot stream (27) sent to a solvent recovery column (28).

The lighter material (3) separated from the separator (2), heavy material after desulfurization (16) and the aromatic extract stream (29) are mixed together to form a combined feedstock (30) and is routed to the main fractionator column (31) of the thermal cracker unit producing premium quality coke. The feedstock is mixed with an internal recycle fraction to form the secondary feed stream (32), which is then heated in a furnace (38). The hot secondary feedstock (39) is then sent to the one of the coking drums (40, 41), which is in feed processing mode and is provided an extended residence time to allow completion of coking reactions. The product vapors (42) which are generated during thermal cracking reactions inside the coke drum is sent to the main fractionator column (31). From the main fractionator column, gaseous products (33), kerosene (34), light gas oil (35), heavy gas oil (36) and fuel oil component (37) are drawn out. The gaseous products along with naphtha are sent to a gas concentration section for further separation. Premium quality coke is produced during the thermal cracking reactions inside the coke drum, which is later removed during the decoking operation.

In one of the feature of the present invention, the solid petroleum coke which is formed inside the reactors are removed through physical intervention like high pressure water jet after opening of the flanges of the reactor on the top and bottom sections.

In case where desulfurization of the feedstock is carried out prior to the aromatic extraction of the feedstock, the hydrogenation reactions occur which saturates the aromatic molecules, resulting in lesser content of aromatics in the Desulfurized feedstock. If an aromatic extraction unit is placed after the desulfurization unit, the amount of paraffins which are rejected in the process will be much higher, resulting in a lower quantity of feedstock for carrying out the coking reactions. In the present invention, this detrimental situation is avoided by parallel processing of the feedstock in aromatic extraction section and a hydrodesulfurization section with an additional pre-fractionator column. This increases the overall feedstock availability for the coking reactions by minimizing the loss of feedstock for production of anisotropic coke.

Accordingly, the present invention provides a process for production of anisotropic coke from a hydrocarbon feedstock comprising:

(i) routing a first fraction of the hydrocarbon feedstock (1) to a separator column (2) and a second fraction of the hydrocarbon feedstock (1) to an aromatic extractor unit (18);

(ii) separating the first fraction of the hydrocarbon feedstock (1) in the separator column (2), in to a lighter material (3) and a first heavy material (4);

(iii) desulfurizing the first heavy material (4) in a hydrotreater reactor (8) to obtain a second heavy material (16);

(iv) aromatic extracting the second fraction of the feedstock (1) in the aromatic extractor unit (18) parallel to the separator column with a solvent to obtain an aromatic extract stream (29) and paraffinic raffinate stream;

(v) sending a combined feedstock (30) comprising the lighter material (3), the second heavy material (16) and the aromatic extract stream (29) to a main fractionator column (31) to produce a secondary feedstock (32); and (vi) subjecting the secondary feedstock (32) to heating in a furnace and subjecting the hot secondary feedstock to thermal cracking reactions in coke drums to produce the anisotropic coke and lighter hydrocarbon products.

In one of the feature of the present invention, the desulfurization comprises:

(a) heating the first heavy material (4) in a furnace section (7) along with a recycle hydrogen stream from a compressor (12) to obtain a hot feed stream;

(b) desulfurizing the hot feed stream in a hydrotreater reactor (8) for generating a desulfurized fraction (9); and (c) routing the desulfurized fraction to a high pressure separator (10) to separate a hydrogen gas (11) from the desulfurized fraction and then to a low pressure separator (14) to separate other gaseous product (15) and the second heavy material (16).

In another feature of the present invention, the step (a) of desulfurization process optionally adding make up hydrogen gas stream as per requirement.

In one feature of the present invention, the aromatic extraction comprises:

a. extracting the second part of the feedstock (1) in the aromatic extractor unit (18) parallel to the separator column with the solvent streams (19, 20) coming from solvent recovery columns (23, 28) to obtain a paraffinic raffinate stream (21) and an initial aromatic extract stream (25);

b. heating the paraffinic raffinate stream (21) in a heater (22) and then sending to a first solvent recovery column (23) to obtain a paraffinic raffinate (24) and routing the paraffinic raffinate (24) to other secondary processing units for further conversion;

c. heating the initial aromatic extract stream (25) in a heater (26) to obtain a hot stream (27) and then sending to a second solvent recovery column (28) to obtain the aromatic extract stream (29).

In one feature of the present invention, the thermal cracking comprises:

(a) heating the secondary feed stream (32) in a heat furnace (38) to obtain a hot secondary feedstock (39);

(b) thermal cracking the hot secondary feedstock (39) in one of coking drums (40, 41), which is in feed processing mode and is provided an extended residence time to allow completion of coking reactions to obtain a product vapor (42) and anisotropic coke;

(c) routing the product vapor (42) to the main fractionator column (31) to obtain a gaseous product (33), kerosene (34), light gas oil (35), heavy gas oil (36) and fuel oil component (37); and (d) producing the anisotropic coke during the thermal cracking reactions inside the coke drums, which is later removed during the decoking operation.

In another feature of the present invention, in the above thermal cracking, the gaseous products along with naphtha are sent to a gas concentration section for further separation. In yet another feature of the present invention, in step (a) of the above thermal cracking, the secondary feedstock is mixed with an internal recycle fraction to form the secondary feed stream (32).

In another feature of the present invention, the hydrotreater reactor (8) operates at a temperature ranging from 330 to 380° C. and pressure ranging from 40 to 50 Bar.

In another feature of the present invention, the aromatic extractor unit (18) is operated at a temperature ranging from 30 to 150° C. with the Solvent/hydrocarbon Feedstock weight ratio ranging from 1:1 to 3:1 (wt/wt).

In yet another feature of the present invention, the solvent is selected from the group consisting of N-methyl pyrrolidone (NMP), diethylene glycol, sulpholane, dimethyl sulfoxide, monomethyl formamide, tetraethylene glycol or furfural.

In yet another feature of the present invention, the thermal cracker unit produces the premium quality anisotropic coke is operated at a temperature ranging from 470 to 510° C. and a pressure ranging from 0.5 to 15 Kg/cm² (g). Preferably the thermal cracker unit is operated at a temperature ranging from 480° C. to 500° C., and pressure ranging from 1 to 6 Kg/cm² (g). The residence time provided in coke drums is in the range of 10 to 30 hours.

The present invention also provides a system for production of anisotropic coke from a hydrocarbon feedstock comprising:
 (i) a separator column (2) to receive a first fraction of the hydrocarbon feedstock (1) and separating it in to a first lighter material (3) and first heavy material (4);
 (ii) an aromatic extractor unit (18) parallel and down to the separator column (2) for extracting a second fraction of the hydrocarbon feedstock (1) with a solvent to obtain an aromatic extract stream (29);
 (iii) a hydrotreater reactor (8) in connection with the separator column for desulfurizing the first heavy material (4) to obtain a second heavy material (16); and
 (iv) a thermal cracker unit having a main fractionator column (31) which receives a combined feedstock consisting of first lighter material, aromatic extract stream and second heavy material and produces a secondary feedstock (32) and coke drums for thermally cracking the secondary feedstock after heating in a furnace for producing premium quality anisotropic coke.

In one of the feature of the present invention, the system comprises:
 (a) a furnace section (7) in connection and prior to the hydrotreater reactor for heating the first heavy material (4) along with a recycle hydrogen stream to obtain a hot feed stream;
 (b) a compressor (12) in connection with the furnace section (7) for providing the recycle hydrogen stream;
 (c) the hydrotreater reactor (8) for desulfurizing the hot feed stream for generating a desulfurized fraction (9); and
 (d) a high pressure separator (10) for separating the desulfurized fraction in to a hydrogen gas (11) and a low pressure separator (14) to separate other gaseous product (15) and second heavy material (16).

In another of the feature of the present invention, the system comprises:
 a. the aromatic extractor unit (18) parallel to the separator column for extracting the second part of the feedstock (1) with the solvent streams (19, 20) to obtain a paraffinic raffinate stream (21) and an initial aromatic extract stream (25);
 b. a heater (22) for heating the paraffinic raffinate stream (21);
 c. a first solvent recovery column (23) to receive the paraffinic raffinate stream (21) and for providing solvent stream (19) and to obtain a paraffinic raffinate (24) and recovered solvent;
 d. a heater (26) for heating the aromatic extract stream (25) to obtain a hot stream (27); and
 e. a second solvent recovery column (28) to receive the hot stream (27) and for providing solvent stream (20) and to obtain the aromatic extract stream (29).

In yet another feature of the present invention, the system comprises:
 (a) a heat furnace (38) for heating the secondary feedstock (32) and to obtain a hot secondary feedstock (39);

(b) coking drums (40, 41), for coking through thermal cracking of the hot secondary feedstock (39) in feed processing mode and is provided an extended residence time to allow completion of coking reactions to obtain a product vapor (42) and premium quality anisotropic coke; and
 (c) the main fractionator column (31) for fractionating the product vapor (42) to obtain a gaseous product (33), kerosene (34), light gas oil (35), heavy gas oil (36) and fuel oil component (37).

The following non-limiting examples illustrate in details about the invention. However, they are, not intended to be limiting the scope of present invention in any way.

Example 1

Clarified oil with properties provided in Table 1, was taken for batch mode extraction as per procedure explained below.

TABLE 1

| Sulfur, wt % | 1 |
| Aromatics, wt % | 70.5 |
| Saturates, wt % | 29.5 |
| $H_2$, wt % | 11 |
| Aromaticity, wt % | 38 |

100 kg CLO with properties as given in Table 1 was split into two fractions in 9:1 ratio. The 10 kg CLO was subjected to aromatic extraction using NMP as solvent at 45° C. temperature in bench scale batch extractor unit. The remaining 90 kg of CLO was subjected to distillation to remove lighters of ~6 wt % and the heavier portion was subjected to hydrotreatment at 340° C. temperature and 42 Bar pressure. The final feed blend was prepared by mixing the Desulfurized CLO and Aromatic extract samples and the properties are provided in Table 2.

TABLE 2

| Sulfur, wt % | 0.26 |
| Aromatics, wt % | 66.41 |
| Saturates, wt % | 33.59 |
| $H_2$, wt % | 11.66 |

One experiment was carried out by using the clarified oil feedstock blend as provided in Table 2 in Batch-Coker unit and the coke generated was calcined. The calcined coke sample was analyzed in XRD analysis for Crystallinity. Experimental conditions and the results are provided in Table 3.

TABLE 3

| (i) | Parameter | (ii) | Value |
| --- | --- | --- | --- |
| (iii) | Temperature, ° C. | (iv) | 490 |
| (v) | Pressure, Bar | (vi) | 5 |
| (vii) | Residence time, hrs | (viii) | 2 |
| (ix) | Coke calcination temperature, ° C. | (x) | 1300 |
| (xi) | Calcined Coke Crystallinity, % | (xii) | 66.8 |
| (xiii) | Sulfur in coke, wt % | (xiv) | 0.29 |

Example 2

Clarified oil with properties provided in Table 4, was taken for batch mode extraction as per procedure explained below.

TABLE 4

| | |
|---|---|
| Sulfur, wt % | 1.88 |
| Aromatics, wt % | 76.6 |
| Saturates, wt % | 23.4 |
| H2, wt % | 10.5 |

100 kg CLO with properties as given in Table 4 was split into two fractions in 9:1 ratio. The 10 kg CLO was subjected to aromatic extraction using NMP as solvent at 45° C. temperature in bench scale batch extractor unit. The aromatic extract was separated. The remaining 90 kg of CLO was subjected to distillation to remove lighters of ~6 wt % and the heavier portion was subjected to hydrotreatment at 340° C. temperature and 42 Bar pressure. The final feed blend was prepared by mixing the Desulfurized CLO and Aromatic extract samples and the properties are provided in Table 5.

TABLE 5

| | |
|---|---|
| Sulfur, wt % | 0.37 |
| Aromatics, wt % | 63.41 |
| Saturates, wt % | 30.59 |
| $H_2$, wt % | 11.25 |

One experiment was carried out by using the clarified oil feedstock blend as provided in Table 5 in Batch-Coker unit and the coke generated was calcined. The calcined coke sample was analyzed in XRD analysis for Crystallinity. Experimental conditions and the results are provided in Table 6.

TABLE 6

| (i) | Parameter | (ii) | Value |
|---|---|---|---|
| (iii) | Temperature, ° C. | (iv) | 490 |
| (v) | Pressure, Bar | (vi) | 5 |
| (vii) | Residence time, hrs | (viii) | 2 |
| (ix) | Coke calcination temperature, ° C. | (x) | 1300 |
| (xi) | Calcined Coke Crystallinity, % | (xii) | 64.2 |
| (xiii) | Sulfur in coke, wt % | (xiv) | 0.40 |

Example 3

Clarified oil with properties provided in Table 7, was taken for batch mode extraction as per procedure explained below.

TABLE 7

| Property | Value |
|---|---|
| Sulfur, wt % | 1.88 |
| Aromatics, wt % | 76.6 |
| Saturates, wt % | 23.4 |
| $H_2$, wt % | 10.5 |

100 kg CLO with properties as given in Table 7 was split into two fractions in 9:1 ratio. The 10 kg CLO was subjected to aromatic extraction using NMP as solvent at 45° C. temperature in bench scale batch extractor unit. The aromatic extract was separated.

The remaining 90 kg of CLO was subjected to distillation to remove lighters of ~6 wt % and the heavier portion was subjected to hydrotreatment at 340° C. temperature and 42 Bar pressure.

The final feed blend was prepared by mixing the Desulfurized CLO and Aromatic extract samples and the properties are provided in Table 8.

TABLE 8

| Property | Value |
|---|---|
| Sulfur, wt % | 0.57 |
| Aromatics, wt % | 72.45 |
| Saturates, wt % | 27.55 |
| $H_2$, wt % | 11.09 |

One experiment was carried out by using the clarified oil feedstock blend as provided in Table 8 in Batch-Coker unit and the coke generated was calcined. The calcined coke sample was analyzed in XRD analysis for Crystallinity. Experimental conditions and the results are provided in Table 9.

TABLE 9

| Parameter | Value |
|---|---|
| Temperature, ° C. | 486 |
| Pressure, Bar | 3.0 |
| Residence time, hrs | 2 |
| Coke calcination temperature, ° C. | 1300 |
| Calcined Coke Crystallinity, % | 64.4 |

It can be seen from the above example that in the process scheme of present invention, the high sulphur feedstock can be effectively converted to low sulphur feedstock while minimizing the reduction in aromatic content. This enables the production of anisotropic coke in the scheme.

Comparative Example 1A

Experiment was carried out using the CLO sample having properties as provided in Table 1a.

TABLE 1a

| | |
|---|---|
| Sulfur, wt % | 1.88 |
| Aromatics, wt % | 76.6 |
| Saturates, wt % | 23.4 |
| H2, wt % | 10.5 |

In order to reduce the sulfur content to an acceptable level of 0.5 wt %, hydrotreatment was carried out using the sample. The properties of the hydrotreated CLO sample are provided in Table 2a.

TABLE 2a

| | |
|---|---|
| Sulfur, wt % | 0.549 |
| Aromatics, wt % | 44.5 |
| Saturates, wt % | 45.5 |
| H2, wt % | 11.4 |

One experiment was carried out by using the clarified oil feedstock blend as provided in Table 2a in Batch-Coker unit and the coke generated was calcined. The calcined coke sample was analyzed in XRD analysis for Crystallinity. Experimental conditions and the results are provided in Table 3a.

TABLE 3a

| (i) | Parameter | (ii) | Value |
|---|---|---|---|
| (iii) | Temperature, ° C. | (iv) | 490 |
| (v) | Pressure, Bar | (vi) | 5 |
| (vii) | Residence time, hrs | (viii) | 2 |

TABLE 3a-continued

| (i) | Parameter | (ii) | Value |
|---|---|---|---|
| (ix) | Coke calcination temperature, ° C. | (x) | 1300 |
| (xi) | Calcined Coke Crystallinity, % | (xii) | 43.1 |
| (xiii) | Sulfur in coke, wt % | (xiv) | 0.50 |

As seen from the Table 3a, the Crystallinity of calcined coke sample is much lower than desired value even though the sulfur content of the calcined coke sample is within limit of 0.5 wt %. This is due to the significant reduction in aromatic content of the feedstock due to hydrogenation of the aromatic molecules during the hydrogenation operation.

Advantages of the Present Invention

The following are the technical advantages of the present invention over the conventional process:

(a) Low aromatic and high sulfur containing feedstock can be fed to the invented process, as the same has sub sections for aromatic extraction and hydrodesulfurization to increase the aromatic content and reduce the sulfur contents of the feedstock.

(b) The process effectively reduces the aromatic saturation of the feedstock while subjecting a high sulfur feedstock to hydrotreating process by effectively distributing feedstock between aromatic extraction section and hydrotreatment sections.

(c) Efficient process to convert the high sulfur feed into low sulfur to produce anisotropic coke meeting the requirements of the industrial standards.

(d) Effective process conditions for the above said conversions.

The invention claimed is:

1. A process for production of anisotropic coke from a hydrocarbon feedstock comprising:
   (i) routing a first fraction of the hydrocarbon feedstock to a separator column and a second fraction of the hydrocarbon feedstock to an aromatic extractor unit;
   (ii) separating the first fraction of the hydrocarbon feedstock in the separator column, in to a lighter material and a first heavy material;
   (iii) desulfurizing the first heavy material in a hydrotreater reactor to obtain a second heavy material;
   (iv) aromatic extracting the second fraction of the hydrocarbon feedstock in the aromatic extractor unit parallel to the separator column with a solvent to obtain an aromatic extract stream and a paraffinic raffinate stream;
   (v) sending a combined feedstock comprising the lighter material, the second heavy material and the aromatic extract stream to a main fractionator column of a thermal cracker unit to obtain a secondary feedstock; and
   (vi) heating the secondary feedstock in a furnace to obtain a hot secondary feedstock and thermally cracking the hot secondary feedstock in coke drums for producing the anisotropic coke and lighter hydrocarbon product.

2. The process as claimed in claim 1, wherein the desulfurization comprises:
   (a) heating the first heavy material in a furnace section along with a recycle hydrogen stream from a compressor to obtain a hot feed stream;
   (b) desulfurizing the hot feed stream in the hydrotreater reactor for generating a desulfurized fraction; and
   (c) routing the desulfurized fraction to a high pressure separator to separate a hydrogen gas from the desulfurized fraction and then to a low pressure separator to separate other gaseous product and the second heavy material.

3. The process as claimed in claim 1, wherein the aromatic extraction comprises:
   a. extracting the second part of the feedstock in the aromatic extractor with the solvent coming from solvent recovery sections to obtain the paraffinic raffinate stream and an initial aromatic extract stream;
   b. sending the paraffinic raffinate stream to a first solvent recovery section to separate the solvent and to obtain a paraffinic raffinate and routing the paraffinic raffinate to other secondary processing units for further conversion; and
   c. sending the initial aromatic extract stream to a second solvent recovery section to separate the solvent and to obtain the aromatic extract stream.

4. The process as claimed in claim 1, wherein the thermal cracking comprises:
   (a) heating the secondary feedstock in a heat furnace to obtain a hot secondary feedstock;
   (b) thermal cracking the hot secondary feedstock in one of coking drums, which is in feed processing mode by providing an extended residence time to allow completion of coking reactions to obtain a product vapor and anisotropic coke;
   (c) routing the product vapor to the main fractionator column to obtain gaseous products, naphtha, kerosene, light gas oil, heavy gas oil and fuel oil component; and
   (d) removing the anisotropic coke by a decoking operation.

5. The process as claimed in claim 1, wherein a weight ratio of the hydrocarbon feedstock is split into two fractions routed to the separator column and the aromatic extractor unit is in the range of 0.1 to 10.

6. The process as claimed in claim 1, wherein the hydrocarbon feedstock is selected from the group consisting of clarified oil or slurry oil from fluid catalytic cracking unit, reduced fuel oil (RFO) from the bottom of delayed coker quench column, coker fuel oil, reduced crude oil, vacuum residue, vacuum gasoil, aromatic extracts, thermal tar, ethylene tar, unconverted oil from hydrocracker unit and a blend thereof.

7. The process as claimed in claim 1, wherein the separator column operates at a pressure of 0.1 to 3 $Kg/cm^2(g)$ with a bottom temperature in the range of 350 to 380° C.

8. The process as claimed in claim 1, wherein the hydrotreater reactor operates at a temperature ranging from 330 to 380° C. and pressure ranging from 40 to 50 Bar.

9. The process as claimed in claim 1, wherein the aromatic extractor unit is operated at a temperature ranging from 30 to 150° C. with the solvent/hydrocarbon feedstock weight ratio ranging from 1:1 to 3:1 (wt/wt).

10. The process as claimed in claim 1, wherein the solvent is selected from the group consisting of N-methyl pyrrolidone (NMP), diethylene glycol, sulpholane, dimethyl sulfoxide, monomethyl formamide, tetraethylene glycol and furfural.

11. The process as claimed in claim 1, wherein the thermal cracker unit producing the anisotropic coke is operated at a temperature ranging from 470 to 510° C., pressure ranging from 0.5 to 15 $Kg/cm^2$ (g) and residence time ranging from 10 to 30 hrs.

12. A system for production of anisotropic coke from a hydrocarbon feedstock comprising:

(i) a separator column to receive a first fraction of the hydrocarbon feedstock and separating it in to a lighter material and first heavy material;

(ii) an aromatic extractor unit parallel to the separator column for extracting a second fraction of the hydrocarbon feedstock with a solvent to obtain an aromatic extract stream;

(iii) a hydrotreater reactor in connection with the separator column for desulfurizing the first heavy material to obtain a second heavy material; and (iv) a thermal cracker unit having a main fractionator column, furnace and coke drums for thermally cracking a combined feedstock consisting of the lighter material, aromatic extract stream and the second heavy material for producing the anisotropic coke and lighter hydrocarbon product.

13. The system as claimed in claim 12, wherein the system comprises:

(a) a furnace section in connection and prior to the hydrotreater reactor for heating the first heavy material along with a recycle hydrogen stream to obtain a hot feed stream;

(b) a compressor in connection with the furnace section for providing the recycle hydrogen stream;

(c) the hydrotreater reactor for desulfurizing the hot feed stream for generating a desulfurized fraction; and (d) a high pressure separator for separating the desulfurized fraction into a hydrogen gas and a low pressure separator to separate other gaseous product and the second heavy material.

14. The system as claimed in claim 12, wherein the system comprises:

a. the aromatic extractor unit parallel to the separator column for extracting the second part of the feedstock with the solvent streams to obtain a paraffinic raffinate stream and an initial aromatic extract stream;

b. a first solvent recovery section to receive the paraffinic raffinate stream and to separate the solvent to obtain a paraffinic raffinate and recovered solvent; and c. a second solvent recovery section to receive the initial aromatic extract stream and to separate the solvent and to obtain the aromatic extract stream.

15. The system as claimed in claim 12, wherein the system comprises:

a. the main fractionator column which receives a combined feed stream from the separator column, aromatic extraction section and hydrotreatment section to prepare a secondary feedstock and also for fractionating the product vapor from coke drums to obtain a gaseous product, kerosene, light gas oil, heavy gas oil and fuel oil component;

b. a furnace for heating the secondary feedstock from the main fractionator column and to obtain a hot secondary feedstock; and c. coking drums for coking through thermal cracking of the hot secondary feedstock in feed processing mode by providing an extended residence time to allow completion of coking reactions to obtain a product vapor and the anisotropic coke.

\* \* \* \* \*